United States Patent Office
3,080,359
Patented Mar. 5, 1963

3,080,359
17β-HYDROXY-ANDROSTANE-[3,2-b]-THI-
AZOLE AND DERIVATIVES THEREOF
Howard J. Ringold, Carl Djerassi, and John A. Zderic,
Mexico City, Mexico, assignors, by mesne assignments,
to Syntex Corporation, a corporation of Panama
No Drawing. Filed June 24, 1960, Ser. No. 38,441
Claims priority, application Mexico Aug. 24, 1959
20 Claims. (Cl. 260—239.5)

The present invention relates to novel cyclopentano-phenanthrene compounds and process of preparing same.

More particularly the invention relates to novel thiazole-steroid compounds and more specifically to novel derivatives of the androstane series in which a thiazole moiety is fused to the androstane nucleus. The androstane nucleus may contain an aliphatic hydrocarbon at C-17α, a methyl or a fluorine group at C-4 or C-6, a keto or hydroxyl group at C-11 and a halogen such as fluorine or chlorine at C-9α. The androstane nucleus may also contain unnsaturation at C-4, 5 and/or at C-6, 7, in which case a methyl group may be present at C-4 or at C-6 or a halogen such as fluorine, chlorine or bromine at C-4.

The novel compounds of the present invention are hormones of the androgenic type having favorable anabolic, anti-gonadotrophic and anti-estrogenic activity and may be illustrated by the following formulas:

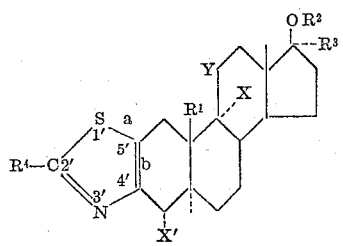

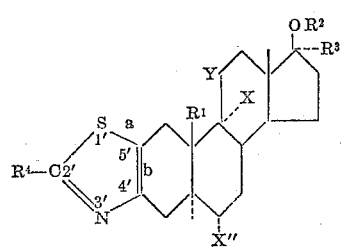

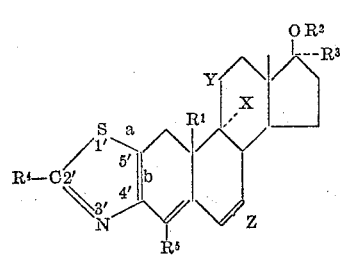

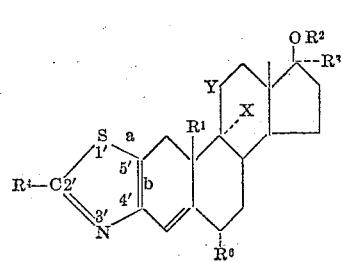

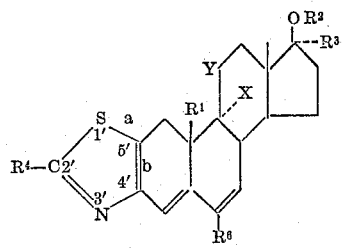

In the above formulas, $R^1$ represents hydrogen or methyl; $R^2$ represents hydrogen or the acyl residue of a hydrocarbon carboxylic acid having less than 12 carbon atoms, saturated or unsaturated, straight chain or branched chain aliphatic, cyclic, cyclic aliphatic, aromatic and may be substituted by functional groups such as hydroxyl, acyloxy of up to 12 carbon atoms, alkoxy of up to 8 carbon atoms, amino or halogen; $R^3$ represents hydrogen or an aliphatic hydrocarbon, saturated or unsaturated, containing up to eight carbon atoms; $R^4$ represents hydrogen, lower alkoxy, aryloxy, aliphatic hydrocarbon, saturated or unsaturated, containing up to 8 carbon atoms, aryl or araliphatic containing up to 12 carbon atoms, which may or may not contain substituents such as alkoxy, hydroxy, methylenedioxy or dihydroxy groups; $R^5$ represents hydrogen, methyl, fluorine, chlorine or bromine; $R^6$ represents hydrogen or methyl; Y represents hydrogen, keto or β-hydroxy; X represents hydrogen and when Y and R' are other than hydrogen, X represents hydrogen, fluorine or chlorine. X' represents hydrogen or methyl; X" represents hydrogen or fluorine and when X and Y are hydrogen, X" may also be methyl. Z indicates a double bond or a saturated linkage between C-6 and C-7.

Typical ester groups at C-17β include the acetate, propionate, butyrate, hemisuccinate, enanthate, caproate, benzoate, phenoxyacetate, trimethylacetate, aminoacetate, cyclopentylpropionate and β-chloropropionate.

Typical aliphatic hydrocarbon groups at C-17α are methyl, ethyl, propyl, butyl, vinyl, 1-propenyl, 2-butenyl, ethinyl and 1-butinyl.

Typical groups at position 2' are methyl, ethyl, propyl, phenyl, p-methoxyphenyl, p-ethoxy-phenyl, 3,4-methylenedioxyphenyl, 3,4-dihydroxyphenyl, phenoxy and ethoxy.

The following equation illustrates in part a method for preparing the novel compounds of the present invention:

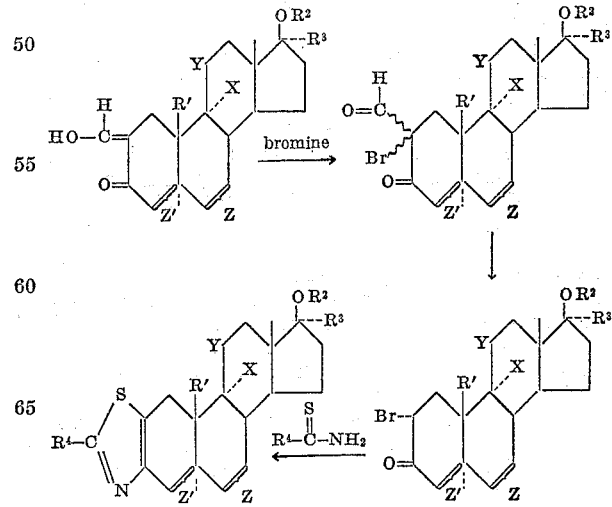

In the above formulas R', $R^2$, $R^3$, $R^4$, X, Y and Z have the same meaning as set forth previously. Z' indicates a double bond or a saturated linkage between C-4 and C-5.

In practicing the process above outlined a 2-hydroxymethylene-testosterone or a 2-hydroxymethylene-dihydroallotestosterone is reacted with a slight excess of a molar equivalent of bromine in a solvent such as methanol or tertiary butanol and in the presence of sodium or potassium acetate at a temperature below 15° C. The thus formed 2-bromo-2-aldehyde-compound is refluxed with a dilute methanolic solution of sodium methoxide for a short period of time to form the 2α-bromo derivative. After condensation of the latter with a thioformamide or a substituted thioformamide such as thioacetamide, ethylthioacetamide, thiobenzamide, phenylthioacetamide, xanthogenamide or phenoxythioacetamide in a solvent such as ethanol for approximately eight hours, followed by dilution with water and extraction with a solvent such as ether or ethyl acetate, there is finally obtained the thiazolesteroid.

Alternatively, androstane compounds having no unsaturated bond capable of being brominated, can be formed directly by reacting the androstane compound with one molar equivalent of bromine in acetic acid to form the 2α-bromo compound which is then condensed with a thioamide in the same manner as set forth above.

This latter process may be illustrated by the following equation:

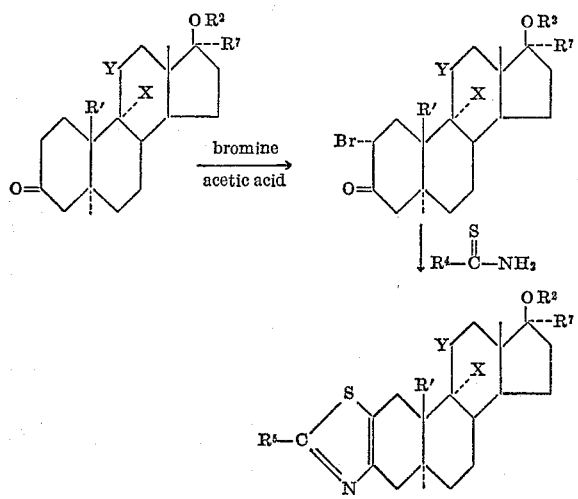

In the above formulas, R' R$^2$, R$^4$, X and Y have the same meaning as set forth previously. R$^7$ represents hydrogen or an alkyl radical containing up to eight carbon atoms.

The following examples serve to illustrate but are not intended to limit the scope of the invention:

*Example I*

A solution of 1 g. of dihydroallotestosterone in 50 cc. of acetic acid was treated with a few drops of a saturated solution of hydrogen bromide in acetic acid and then with 1.1 molar equivalents of bromine dissolved in acetic acid, containing 1.1 molar equivalents of sodium acetate, little by little, with stirring and maintaining the temperature below 20° C. After complete decolorization, the mixture was kept for half an hour at room temperature, poured into ice water and the 2α-bromo-dihydroallotestosterone was collected by filtration, washed with water and dried under vacuum.

A solution of 1 g. of 2α-bromo-dihydroallotestosterone in 25 cc. of ethanol was refluxed with 2 g. of thioformamide for 8 hours. It was then concentrated to a small volume under reduced pressure, diluted with water and extracted with ethyl acetate. Aqueous sodium hydroxide solution was added to the aqueous phase until it was strongly alkaline and again extracted with ethyl acetate. This extract was washed several times with water, dried over anhydrous sodium sulfate and evaporated. Recrystallization of the residue from acetone-hexane afforded 17β-hydroxy-androstane-[3,2-b]-thiazole.

*Example II*

By following the method described in the preceding example, 17α-methyl-dihydroallotestosterone was converted into 2α-bromo-17α-methyl-dihydroallotestosterone and finally into 17α-methyl-17β-hydroxy-androstan-[3,2-b]-thiazole.

*Example III*

By following the method described in Example I, but using as starting steroid the acetate of 2α-bromo-17α-methyl-19-nor-dihydroallotestosterone, there was obtained 17α-methyl-17β-acetoxy-19-nor-androstane-[3,2-b]-thiazole.

*Example IV*

By following the method described in Example I, 6α-fluoro-17α-methyl-dihydroallotestosterone, 6α-fluoro-17α-ethyl-dihydroallotestosterone and the corresponding 19-nor derivatives thereof were converted into 6α-fluoro-17α-methyl-17β-hydroxy-androstan-[3,2-b]-thiazole; 6α-fluoro-17α-ethyl-17α-hydroxy-androstan-[3,2-b]-thiazole; 6α-fluoro-17α-methyl-17β-hydroxy-19-nor-androstan-[3,2-b]-thiazole and 6α-fluoro-17α-ethyl-17β-hydroxy-19-nor-androstan-[3,2-b]-thiazole.

*Example V*

By following the method described in Example I, there were obtained 9α-fluoro-17α-methyl-11β,17β-dihydroxy-androstan-[3,2-b]-thiazole, 9α-fluoro-17α-methyl-11-keto-17β-hydroxy-androstan-[3,2-b]-thiazole and 17α-methyl-11β,17β-dihydroxy-androstan-[3,2-b]-thiazole from 9α-fluoro-17α-methyl-11β-hydroxy-dihydroallotestosterone, 9α-fluoro-17α-methyl-11-keto-dihydroallotestosterone and 17α-methyl-11β-hydroxy-dihydroallotestosterone respectively.

*Example VI*

By substituting in the methods of the preceding examples thioacetamide for thioformamide there was obtained 17β-hydroxy-androstane-2'-methyl-[3,2-b]-thiazole; 17α-methyl-17β-hydroxy-androstane-2'-methyl-[3,2-b]-thiazole; 17α-methyl-17β-acetoxy-19-nor-androstane-2'-methyl-[3,2-b]-thiazole; 6α-fluoro-17α-methyl-17β-hydroxy-androstane-2'-methyl-[3,2-b]-thiazole; 6α-fluoro-17α-ethyl-17β-hydroxy-androstane-2'-methyl-[3,2-b]-thiazole; 6α-fluoro-17α-methyl-17β-hydroxy-19-nor-androstane-2'-methyl-[3,2-b]-thiazole; 6α-fluoro-17α-ethyl-17β-hydroxy-19-nor-androstane-2'-methyl-[3,2-b]-thiazole; 9α-fluoro-17α-methyl-11β,17β-dihydroxy-androstane-2'-methyl-[3,2-b]-thiazole, 9α-fluoro-17α-methyl-11-keto-17β-hydroxy-androstan-2'-methyl-(3,2-b) thiazole and 17α-methyl-11β,17β-dihydroxy-androstan-2'-methyl-[3,2-b]-thiazole.

By substituting in the methods of Examples I-V, thiobenzamide for thioformamide, there were obtained the corresponding compounds having a phenyl group at position 2'.

*Example VII*

In the methods of Examples I-V, there was substituted the thioformamide by xanthogenamide to produce finally the corresponding compounds having an ethoxy group at position 2'.

*Example VIII*

A mixture of 1 g. of 2-hydroxymethylene-testosterone, 13 cc. of methanol and 0.4 g. of potassium acetate was treated with 1.1 molar equivalents of bromine dissolved in 2 cc. of carbon tetrachloride, with stirring, in the course of 50 minutes and maintaining the temperature below 15° C. There was then added 2 cc. of 2 N methanolic solution of sodium methoxide and the mixture was refluxed for 10 minutes, at the end of which the solvent was evaporated under reduced pressure, diluted with water and extracted with ether. The ether was washed with water, dried over anhydrous sodium sulfate and evaporated. Crystallization of the residue from acetone-hexane then afforded the desired 2α-bromo-testosterone.

By following the method described in Example I, 2.0 g. of the above 2α-bromotestosterone was condensed with 4.0 g. of thioformamide in accordance with the procedure set forth in such example to finally furnish 17β-hydroxy-Δ⁴-androstene-[3,2-b]-thiazole.

Example IX

In accordance with the method described in the preceding example, 2-hydroxymethylene-11-keto - 17α - methyl-testosterone and 2-hydroxymethylene-11β-hydroxy - 17α-ethyl-testosterone were converted into the corresponding 2α-bromo-derivatives and by condensation with thioformamide were finally converted into 17α-methyl-11-keto-17β-hydroxy-Δ⁴-androstene-[3,2-b]-thiazole and 17α-ethyl-11β,17β-dihydroxy-Δ⁴-androstene-[3,2-b]-thiazole.

Example X

A solution of 2-hydroxymethylene-testosterone in 50 cc. of t-butanol was treated with 1.1 molar equivalents of sodium methoxide and then little by little with 1.1 molar equivalents of bromine dissolved in 2 cc. of carbon tetrachloride under stirring, in the course of 1 hour and at temperatures below 10° C. The mixture was then stirred at room temperature until decolorization and the solvent was evaporated under reduced pressure; there was thus obtained 2-bromo-2-aldehydo-testosterone. The latter was dissolved in 10 cc. of a 2 N solution of sodium methoxide, refluxed for 10 minutes and cooled, water was added, the mixture was extracted with ether and the extract was washed with water to neutral, dried over anhydrous sodium sulfate and the ether was evaporated. There was thus obtained 2α-bromo-testosterone, which upon reaction with thioformamide in the manner described in Example I afforded 17β-hydroxy-Δ⁴-androstene-[3,2-b]-thiazole, identical with the compound obtained in Example VIII.

The compounds listed under A were treated with ethyl formate and sodium hydride in the manner described by Ringold et al., J. Am. Chem. Soc. 81, 427 (1959) and in U.S. Patent 2,908,693 to introduce a hydroxymethylene group at C-2. The thus formed 2-hydroxymethylene derivatives of the compounds listed under A were in turn converted into the thiazole [3,2-b]-derivatives of the compounds listed under B by following the method described in Examples VIII or X:

| EXAMPLE | A | B |
|---|---|---|
| XI | 19-nor-testosterone | 17β-hydroxy-19-nor-Δ⁴-androstene. |
| XII | 6-dehydro-testosterone | 17β-hydroxy-Δ⁴,⁶-androstadiene. |
| XIII | 17α-vinyl-dihydroallotestosterone | 17α-vinyl-17β-hydroxy-androstane. |
| XIV | 17α-ethinyl-19-nor-dihydroallotestosterone | 17α-ethinyl-17β-hydroxy-19-nor-androstane. |
| XV | 4,17α-dimethyl-17β-acetoxy-testosterone | 4,17α-dimethyl-17β-acetoxy-Δ⁴-androstene. |
| XVI | 9α-fluoro-17α-methyl-11β-hydroxy-testosterone. | 9α-fluoro-17α-methyl-11β,17β-dihydroxy-Δ⁴-androstene. |
| XVII | 4-fluoro-testosterone | 4-fluoro-17β-hydroxy-Δ⁴-androstene. |
| XVIII | 11 keto-6-dehydrotestosterone. | 11-keto-17β-hydroxy-Δ⁴,⁶-androstadiene. |
| XIX | 6α,17α-dimethyltestosterone. | 6α,17α-dimethyl-17β-hydroxy-Δ⁴-androstene. |

Example XX

By following the method described in Example I, 4α-methyl-dihydroallotestosterone, 17α - ethyl-dihydroallotestosterone and 6α-methyl-dihydroallotestosterone were converted into 4α - methyl - 17β - hydroxy-androstane-[3,2-b]-thiazole, 17α - ethyl - 17β - hydroxyandrostane-[3,2-b]-thiazole and 6α-methyl-17β-hydroxy-androstane-[3,2-b]-thiazole.

Example XXI

17β - acetoxy - dihydroallotestosterone and 17β - propionoxy-dihydroallotestosterone were transformed into the corresponding 2α-bromo compounds by employing the method described in Example I, and by further treatment with thioformamide, as described in such example, were further converted into 17β-acetoxy-androstane-[3,2-b]-thiazole and 17β-propionoxyandrostane-[3,2-b]-thiazole.

Example XXII

A mixture of 3 g. of 17α-ethinyl-17β-hydroxy-19-nor-androstane-[3,2-b]-thiazole produced in Example XIV, 150 cc. of anhydrous benzene, 15 cc. of acetic anhydride and 1 g. of p-toluenesulfonic acid was stirred at room temperature for 24 hours and diluted with water; the organic layer was separated, washed with water, 5% sodium carbonate solution and again with water to neutral, dried over anhydrous sodium sulfate and evaporated. Recrystallization of the residue from acetone-hexane afforded the acetate of 17α-ethinyl-17β-hydroxy-19-nor-androstane-[3,2-b]-thiazole.

Example XXIII

In accordance with the method described in Example VIII, 2-hydroxymethylene - 6,17α - dimethyl-6-dehydro-testosterone was converted into the corresponding 2α-bromo derivative and by condensation with thioformamide was finally converted into 6,17α-dimethyl-Δ⁴,⁶-androstadiene-[3,2-b]-thiazole.

The starting material was produced by first treating 6,17α-dimethyl-testosterone by known methods with chloranil in a solvent such as xylene or a mixture of ethyl acetate and acetic acid to furnish 6,17α-dimethyl-6-dehydro-testosterone. The latter compound was then treated with ethyl formate and sodium hydride in the manner described by Ringold et al. in J. Am. Chem. Soc. 81, 427 (1959) to introduce a hydroxymethylene group at C-2.

Example XXIV

In accordance with the method described in Example VIII, 2 - hydroxymethylene - 17α - methyl - 4 - chloro-9α-fluoro-11-keto-testosterone and 2-hydroxymethylene-17α-methyl-4-bromo-9α-fluoro-11-keto-testosterone were transformed into the corresponding 2α-bromo derivatives and finally into 17α-methyl-4-chloro-9α-fluoro-11-keto-17β - hydroxy - Δ⁴ - androstene - [3,2-b] - thiazole and into 17α - methyl - 4 - bromo - 9α - fluoro - 11 - keto-17β-hydroxy-Δ⁴-androstene-[3,2-b]-thiazole.

The starting materials were formed by treating 17α-methyl-Δ⁴,⁹⁽¹¹⁾-androstadien-17β-ol-3-one with hydrogen peroxide in the presence of aqueous sodium hydroxide soluton. The thus formed 17α-methyl-4β,5β-oxido-Δ⁹⁽¹¹⁾-androsten-17β-ol-3-one was reacted with concentrated hydrochloric or hydrobromic acid in acetone solution to give the 17α-methyl-4-(chloro or bromo)-Δ⁴,⁹⁽¹¹⁾-androstadien-17β-ol-3-one, which in turn was treated with hypobromous acid to produce 17α-methyl-4-(chloro or bromo) - 9α-bromo-Δ⁴-androsten-11β,17β-diol-3-one. By reaction of the latter compounds with potassium acetate in methanol solution, there was formed the 17α-methyl-4-(chloro or bromo)-9β,11β-oxido-Δ⁴-androsten-17β-ol-3-one. The epoxide ring was then opened by reaction with anhydrous hydrofluoric acid to form the corresponding halohydrin. By oxidation of the 11β-hydroxyl group as by reaction with chromic acid in aqueous acetic acid, there was formed the corresponding 17α-methyl-4-(chloro or bromo)-9α-fluoro-11-keto-testosterone which upon reaction with ethyl formate and sodium hydride as described by Ringold et al., supra, there was introduced a 2-hydroxymethylene group at C-2.

Example XXV

By following the method described by Ringold et al., J. Am. Chem. Soc. 81, 427 (1959), 6α-fluoro-11β-hydroxy-dihydroallotestosterone was reacted with ethyl formate and sodium hydride to form the corresponding 2-hydroxymethylene derivative, which in turn was converted into the thiazole [3,2-b] derivative in accordance with the method described in Example I.

The 6α-fluoro-11β-hydroxy-dihydroallotestosterone was obtained from the hydrogenation of a solution of 3.0 g. of 6α-fluoro-11β-hydroxy-testosterone in 100 cc. of methanol containing a palladium on charcoal catalyst. After one mole of hydrogen had been absorbed, the catalyst was removed by filtration, the methanol was evaporated to thus furnish a mixture of the 5α and 5β isomers of 6α-fluoro-11β-hydroxy-dihydrotestosterone which was separated by chromatography on neutral alumina.

Example XXVI

By substituting for the thioformamide thioacetamide or xanthogenamide in the method of Examples VIII through XXI, XXIII, XXIV and XXV there were produced the corresponding compounds having a methyl or ethoxy substituent at position 2'.

Example XXVII

By substituting for the thioformamide thiobenzamide in the procedure of Examples VIII through XXV, there were produced the corresponding compounds having a phenyl substituent at position 2'.

Example XXVIII

Upon conventional esterification with acetic anhydride in pyridine solution there was prepared the 17β-acetate of the products formed in Examples I, VIII, XI, XII, XVII, XVIII, XXV, and of the 4α-methyl-17β-hydroxy-androstane-[3,2-b]-thiazole and 6α-methyl-17β-hydroxy-androstane-[3,2-b]-thiazole formed in Example XX, as well as of the products substituted with methyl, phenyl or ethoxy at position 2'.

In a similar conventional manner there was also prepared the propionate, butyrate, cyclopentylpropionate and benzoate.

Example XXIX

Upon treatment with acetic anhydride in benzene solution and in the presence of p-toluenebenzenesulfonic acid, there was prepared the 17β-acetate of the products formed in Examples II through VII, IX, XIII, XVI, XIX, XXIII, XXIV and of the 17α-ethyl-17β-hydroxy-androstane-[3,2-b]-thiazole produced in Example XX.

In a similar manner, there was also produced other esters such as the propionate, enanthate and benzoate of all of the compounds formed in such examples.

We claim:

1. A compound of the following formula:

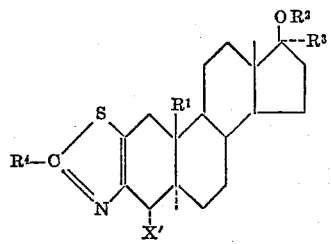

wherein X' is selected from the group consisting of hydrogen and methyl; $R^1$ is selected from the group consisting of hydrogen and methyl; $R^2$ is selected from the group consisting of hydrogen and a hydrocarbon carboxylic acyl group containing less than 12 carbon atoms; $R^3$ is selected from the group consisting of hydrogen and an aliphatic hydrocarbon containing up to 8 carbon atoms; and $R^4$ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms.

2. 17β-hydroxy-androstane-[3,2-b]-thiazole.

3. 17α - methyl - 17β - hydroxy - androstane - [3,2-b]-thiazole.

4. A compound of the following formula:

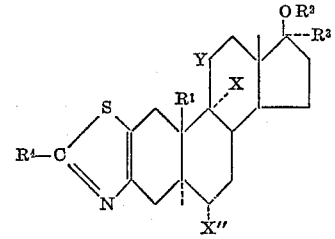

wherein $R^1$ is selected from the group consisting of hydrogen and methyl; $R^2$ is selected from the group consisting of hydrogen and a hydrocarbon carboxylic acyl group containing less than 12 carbon atoms; $R^3$ is selected from the group consisting of hydrogen and an aliphatic hydrocarbon containing up to 8 carbon atoms; $R^4$ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms; Y is selected from the group consisting of keto and β-hydroxy; and X and X'' are selected from the group consisting of hydrogen and fluorine.

5. 9α - fluoro - 17α - methyl - 11β,17β - dihydroxy-androstane-[3,2-b]-thiazole.

6. 6α - fluoro - 11β,17β - dihydroxy - androstane - [3,2-b]-thiazole.

7. A compound of the following formula:

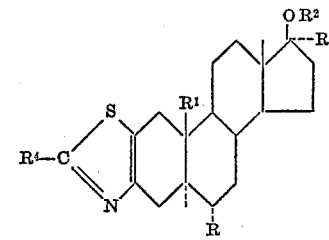

wherein R is selected from the group consisting of methyl and fluorine; $R^1$ is selected from the group consisting of hydrogen and methyl; $R^2$ is selected from the group consisting of hydrogen and a hydrocarbon carboxylic acyl group containing less than 12 carbon atoms; $R^3$ is selected from the group consisting of hydrogen and an aliphatic hydrocarbon containing up to 8 carbon atoms; and $R^4$ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms.

8. 6α - fluoro - 17α - methyl - 17β - hydroxy - androstane-[3,2-b]-thiazole.

9. 6α - methyl - 17β - acetoxy - androstane - [3,2 - b]-thiazole.

10. A compound of the following formula:

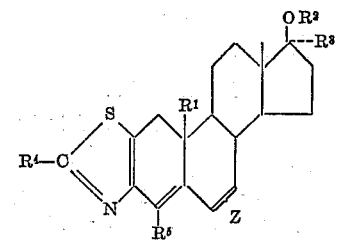

wherein R¹ is selected from the group consisting of hydrogen and methyl; R² is selected from the group consisting of hydrogen and a hydrocarbon carboxylic acyl group containing less than 12 carbon atoms; R³ is selected from the group consisting of hydrogen and an aliphatic hydrocarbon containing up to 8 carbon atoms; R⁴ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms; R⁵ is selected from the group consisting of hydrogen, methyl, fluorine, chlorine and bromine; and Z is selected from the group consisting of a double bond, between C-6 and C-7 and a saturated linkage between C-6 and C-7.

11. 4,17α - dimethyl - 17β - acetoxy - Δ⁴ - androstene-[3,2-b]-thiazole.

12. 4 - fluoro - 17β - hydroxy - Δ⁴ - androstene - 2'-methyl-[3,2-b]-thiazole.

13. A compound of the following formula:

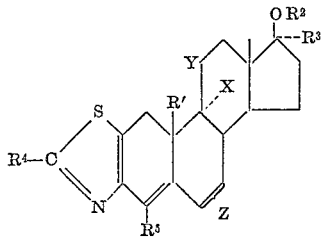

wherein R' is selected from the group consisting of hydrogen and methyl; R² is selected from the group consisting of hydrogen and a hydrocarbon carboxylic acyl group containing less than 12 carbon atoms; R³ is selected from the group consisting of hydrogen and an aliphatic hydrocarbon containing up to 8 carbon atoms; R⁴ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms; R⁵ is selected from the group consisting of hydrogen, methyl, fluorine, chlorine and bromine; X is selected from the group consisting of hydrogen and fluorine; Y is selected from the group consisting of keto and β-hydroxy and Z is selected from the group consisting of a double bond between C-6 and C-7 and a saturated linkage between C-6 and C-7.

14. 17α - methyl - 9α - fluoro - 11β,17β - dihydroxy-Δ⁴-androstene-[3,2-b]-thiazole.

15. 11 - keto - 17β - hydroxy - Δ⁴,⁶ - androstadiene - 2'-methyl-[3,2-b]-thiazole.

16. A compound of the following formula:

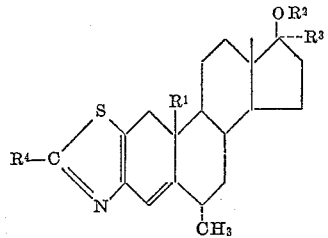

wherein R¹ is selected from the group consisting of hydrogen and methyl; R² is selected from the group consisting of hydrogen and a hydrocarbon carboxylic acyl group containing less than 12 carbon atoms; R³ is selected from the group consisting of hydrogen and an aliphatic hydrocarbon containing up to 8 carbon atoms; R⁴ is selected from the group consisting of hydrogen, an aliphatic hydrocarbon group containing up to 8 carbon atoms; R⁴ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms.

17. 6α,17α - dimethyl - 17β - hydroxy - Δ⁴ - androstene-[3,2-b]-thiazole.

18. A compound of the following formula:

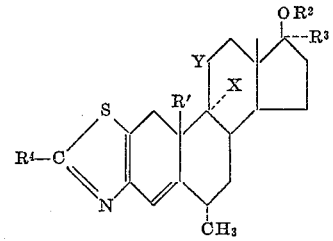

wherein R' is selected from the group consisting of hydrogen and methyl; R² is selected from the group consisting of hydrogen and a hydrocarbon carboxylic acyl group containing less than 12 carbon atoms; R³ is selected from the group consisting of hydrogen and an aliphatic hydrocarbon containing up to 8 carbon atoms; R⁴ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms; X is selected from the group consisting of hydrogen and fluorine; Y is selected from the group consisting of keto and β-hydroxy.

19. A compound of the following formula:

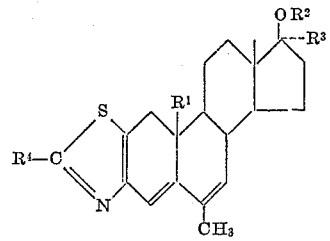

wherein R¹ is selected from the group consisting of hydrogen and methyl; R² is selected from the group consisting of hydrogen and a hydrocarbon carboxylic acyl group containing less than 12 carbon atoms; R³ is selected from the group consisting of hydrogen and an aliphatic hydrocarbon containing up to 8 carbon atoms; and R⁴ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms.

20. A compound of the following formula:

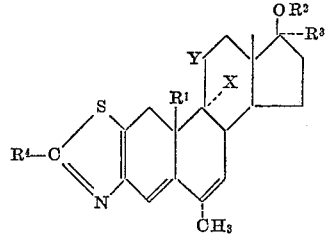

wherein R¹ is selected from the group consisting of hydrogen and methyl; R² is selected from the group consisting of hydrogen and a hydrocarbon carboxylic acyl group containing less than 12 carbon atoms; $R^3$ is selected from the group consisting of hydrogen and an aliphatic hydrocarbon containing up to 8 carbon atoms; $R^4$ is selected from the group consisting of hydrogen, an aliphatic hydrocarbon group containing up to 8 carbon atoms, an aryl group, an aralkyl group containing up to 12 carbon atoms, lower alkoxy and lower alkoxy aryl containing up to 12 carbon atoms; X is selected from the group consisting of hydrogen, fluorine and chlorine; and Y is selected from the group consisting of keto and β-hydroxy.

References Cited in the file of this patent
UNITED STATES PATENTS
2,813,859    Korman _____ Nov. 19, 1957